(12) United States Patent
Nabat et al.

(10) Patent No.: US 7,735,390 B2
(45) Date of Patent: Jun. 15, 2010

(54) HIGH-SPEED PARALLEL ROBOT WITH FOUR DEGREES OF FREEDOM

(75) Inventors: Vincent Nabat, Elgoibar (ES); François Pierrot, Elgoibar (ES); Maria De La O Rodriguez Mijangos, Elgoibar (ES); Jose Miguel Azcoitia Arteche, Elgoibar (ES); Ricardo Bueno Zabalo, Elgoibar (ES); Olivier Company, Elgoibar (ES); Karmele Florentino Perez De Armentia, Elgoibar (ES)

(73) Assignee: Fundacion Fatronik, Elgoibar (ES)

( * ) Notice: Subject to any disclaimer, the term of this patent is extended or adjusted under 35 U.S.C. 154(b) by 0 days.

(21) Appl. No.: 11/816,572

(22) PCT Filed: Feb. 8, 2006

(86) PCT No.: PCT/ES2006/000053

§ 371 (c)(1),
(2), (4) Date: Sep. 19, 2008

(87) PCT Pub. No.: WO2006/087399

PCT Pub. Date: Aug. 24, 2006

(65) Prior Publication Data

US 2009/0019960 A1 Jan. 22, 2009

(30) Foreign Application Priority Data

Feb. 17, 2005 (ES) ................................ 200500357

(51) Int. Cl.
*B25J 17/00* (2006.01)
(52) U.S. Cl. ..................................... 74/490.03; 901/23

(58) Field of Classification Search .............. 74/490.01, 74/490.03, 490.04, 490.05, 490.07, 89.18, 74/89.2, 89.22; 414/735, 917; 901/21, 23, 901/25, 29
See application file for complete search history.

(56) References Cited

U.S. PATENT DOCUMENTS 3,250,996 A * 5/1966 Fleetman .................... 324/146

(Continued)

FOREIGN PATENT DOCUMENTS

DE 33 17 261 12/1983

(Continued)

OTHER PUBLICATIONS

PCT International Search Report dated May 4, 2006 issued in corresponding PCT International Application No. PCT/ES2006/000053.

(Continued)

*Primary Examiner*—Thomas R Hannon
*Assistant Examiner*—Phillip A Johnson
(74) *Attorney, Agent, or Firm*—Ostrolenk Faber LLP

(57) ABSTRACT

The invention relates to a high-speed parallel robot with four degrees of freedom comprising four kinematic chains (1) articulated at one of their ends to a mobile platform (4) carrying the tool (5) and at their other end, through a rotational joint (2), to an actuador integral with a base plate (3). The mobile platform (4) is formed by four members (11), (11'), (12), (12'), linked together by means of articulated linkages (13), at least two of the members being parallel to each other, forming an articulated mobile platform with one degree of freedom in the plane of the mobile platform. The actuators are positioned with any orientation in the base plate (2) and preferably at 45°, 135°, 225° and 315°.

20 Claims, 9 Drawing Sheets

U.S. PATENT DOCUMENTS

| | | | |
|---|---|---|---|
| 4,435,116 A | 3/1984 | Van Deberg | |
| 4,607,578 A | 8/1986 | Inoue et al. | 108/145 |
| 4,976,582 A | 12/1990 | Clavel | 414/729 |
| 5,351,773 A * | 10/1994 | Yanagisawa | 180/8.5 |
| 5,715,729 A | 2/1998 | Toyama et al. | 74/490.03 |
| 5,847,528 A | 12/1998 | Hui et al. | |
| 6,203,254 B1 | 3/2001 | Nashiki et al. | |
| 6,324,934 B1 * | 12/2001 | Monaghan | 74/490.04 |
| 6,425,303 B1 * | 7/2002 | Brogardh et al. | 74/490.03 |
| 6,464,448 B1 * | 10/2002 | Ha | 414/744.5 |
| 6,516,681 B1 * | 2/2003 | Pierrot et al. | 74/490.01 |
| 2003/0121350 A1 * | 7/2003 | Hvittfeldt et al. | 74/490.01 |
| 2004/0103739 A1 | 6/2004 | Brogardh et al. | 74/490.01 |
| 2004/0211284 A1 * | 10/2004 | Roy et al. | 74/490.01 |
| 2005/0172750 A1 * | 8/2005 | Kock et al. | 74/490.01 |

FOREIGN PATENT DOCUMENTS

| | | |
|---|---|---|
| DE | 199 50 357 | 4/2000 |
| EP | 1 084 802 | 3/2001 |
| EP | 1 129 829 | 9/2001 |
| JP | 2004291166 A * | 10/2004 |
| WO | 02/22320 | 3/2002 |
| WO | 03/106115 | 12/2003 |
| WO | 20051009693 | 2/2005 |

OTHER PUBLICATIONS

International Search Report issued May 4, 2006.

\* cited by examiner

HIGH-SPEED PARALLEL ROBOT WITH FOUR DEGREES OF FREEDOM

CROSS REFERENCE TO RELATED APPLICATION

The present application is filed pursuant to 35 U.S.C. §§371, as a national phase conversion of PCT/ES2006/000053, filed Feb. 8, 2006, which claims priority of Spanish Patent Application No. P200500357, filed Feb. 17, 2005, the disclosures of which are hereby incorporated herein by reference. The PCT International Application was published in the Spanish language.

OBJECT OF THE INVENTION

The robot of the invention has the object of moving a platform carrying the corresponding tool, with four degrees of freedom (three translations and one rotation about the vertical axis), with very high accelerations and speeds in any direction.

Another object of the invention is that the actuators of the robot are arranged symmetrically, affording homogenous performance and high rigidity in the entire working volume.

This robot is especially indicated for pick & place tasks.

BACKGROUND OF THE INVENTION

Parallel robots are generally made up of a fixed support or base plate on which there are assembled actuators which, through articulated arms or kinematic links, are linked to a mobile platform which the corresponding tool is anchored to.

A robot of this type with three degrees of freedom is described, for example in U.S. Pat. No. 4,976,582, whereas patent EP 1 084 802 describes a parallel robot with four degrees of freedom (three translations and one rotation).

Parallel robots with four degrees of freedom are very appropriate for carrying out part handling tasks, packaging and assembly, and they have advantages over more complex parallel robots, for example with 6 degrees of freedom, in reference to simplicity, price and movement speed.

The object of European patent 1 084 802 is a parallel robot in which all the linkages of the mobile platform are articulation-type linkages, this being a favorable factor for reaching high speeds and accelerations. This robot comprises four kinematic links operated by means of four actuators which are fixed at one of their ends and with a specific orientation to the base plate, and at their other end to the kinematic link. In turn, the kinematic links are linked to the mobile platform carrying the tool, the mobile platform being made up of two parts or bars which are linked at their ends to the four kinematic links and a third bar which is assembled between the first two, through two articulated linkages, this bar being the one carrying the tool.

The mobile platform allows a rotation of ±45° which can be amplified by means of using gear rings.

The specific design of the mobile platform and the use of articulated linkages leads to obtaining an isostatic configuration and forces a non-homogenous arrangement of the kinematic links, and therefore of the actuators. This particular arrangement of the actuators combined with the isostatic configuration prevents the robot from having a homogenous performance and high rigidity in the entire working volume, which is an important disadvantage.

A modified configuration of the robot described in patent EP 1 084 802 is described for example in the following publication: "I4: A new parallel mechanism for SCARA motions" Proc. of IEEE ICRA: Int. Conf. on Robotics and Automation, Taipei, Taiwan, Sep. 14-19, 2003.

The configuration described in this article seeks to compensate the main limitation of patent EP 1 084 802, i.e. the non-homogenous performance and low rigidity that the configuration has in the entire working volume.

This new configuration is essentially based on a new mobile platform design, which must solve the aforementioned problems, replacing articulated linkages with prismatic joints and the gear rings with pinions-rack. These changes imply, firstly, a considerable reduction of the risk of collision between the different parts of the mobile platform.

Specifically, the mobile platform is formed by three parts, two side parts and a central part, the side parts being linked at their ends to the four kinematic links through ball joints, as in patent EP 1 084 802, whereas the central part is linked to the side parts by means of a prismatic joint. The four kinematic links are in turn fixed to the fixed platform through the four corresponding actuators.

In this configuration, as in European patent 1 084 802, the rotational motors can be replaced with linear motors and the articulated linkages with universal joints. In the specific case of the new configuration described in the mentioned article, four linear motors arranged in the same plane and aligned in the same direction are used.

Another configuration is described in the following article: "A High-Speed Parallel Robot for Scara Motions" Proceeding of the 2004 IEEE International Conference on Robotics & Automotion, New Orleans, La., USA, Apr. 26-May 1, 2004.

This robot is formed by four kinematic links, linked to the mobile platform, operated by four rotational actuators, linked to the fixed base. The main differences compared to the previously described configuration are the use of rotational actuators and the design of the mobile platform. Specifically, the mobile platform is formed by two parts linked together by means of a prismatic guide and a cable and pulley system transforming the linear translational movement of the guide into the desired rotation. This mobile platform design allows the actuators to be arranged at 90° in relation to each other, which involves a symmetrical design and a homogenous performance in the entire working volume.

The main drawback of the last two configurations described is the limitation to reach high accelerations and speeds, the main requirement for pick & place applications. This limitation is due to the use of prismatic guides and more specifically to the recirculation of the balls of the rolling guides.

DESCRIPTION OF THE INVENTION

The robot object of the invention has the advantages of the mentioned robots with four degrees of freedom, eliminating their drawbacks.

Specifically, the main advantages of the robot of the invention are high rigidity, high precision, homogenous performance in the entire working volume, good dynamic performance and very high speeds and accelerations in any direction.

These properties are achieved as a result of the symmetrical arrangement of its actuators, of the use of articulated linkages in the mobile platform and a new mobile platform design.

Specifically, the mobile platform of the robot of the invention is made up of four parts linked together by means of revolving joints, at least two of the parts being parallel to each other, forming an articulated mobile platform called a planar parallelogram having one degree of freedom in said plane.

The working tool is integral with any of the four parts making up the mobile platform.

The kinematic links are formed by a spatial parallelogram made up of four bars, parallel in pairs, linked by means of ball joints.

These kinematic links are linked at one of their ends to one of the articulated linkages of the mobile platform and at their other end, through a rotational or translational joint, to respective actuators assembled in the base plate located in the upper part of the robot, with the particularity that the actuators are positioned in the base plate with any orientation.

The actuators will preferably be symmetrically placed in a fixed structure, such that this symmetrical arrangement of the actuators and, especially, the use of a planar parallelogram in the mobile platform allows obtaining excellent dynamic performance, high rigidity and homogenous performance in the entire working volume.

By controlling the actuators the mobile platform shifts with four degrees of freedom, three translations and one rotation in relation to the vertical axis.

The degree of freedom associated to the planar parallelogram is one rotation in relation to the vertical axis affording the working tool one rotation between −45° and +45°.

An additional mechanical mechanism by means of belt, pulleys or gears can be included to increase the rotation range of the working tool. In this case, the working tool will be integral with any of the additional mechanical parts needed.

DESCRIPTION OF THE DRAWINGS

To complement the description being given and for the purpose of aiding to better understand the features of the invention, a set of drawings is attached as an integral part of said description which shows the following with and illustrative and non-limiting character.

PREFERRED EMBODIMENT OF THE INVENTION

Figure 1:
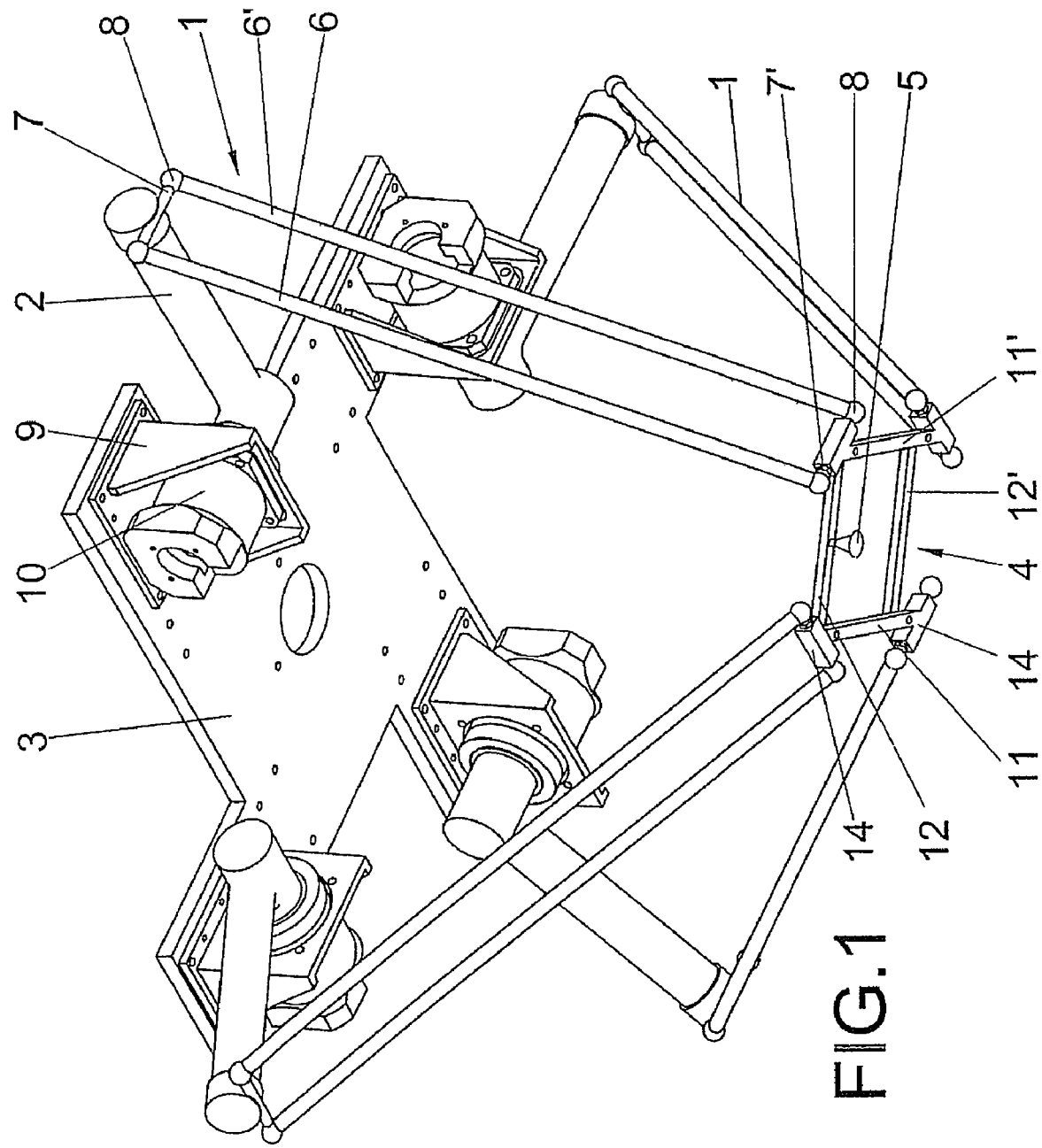
FIG. 1 shows a perspective view of the robot object of the invention.
Figure 2:
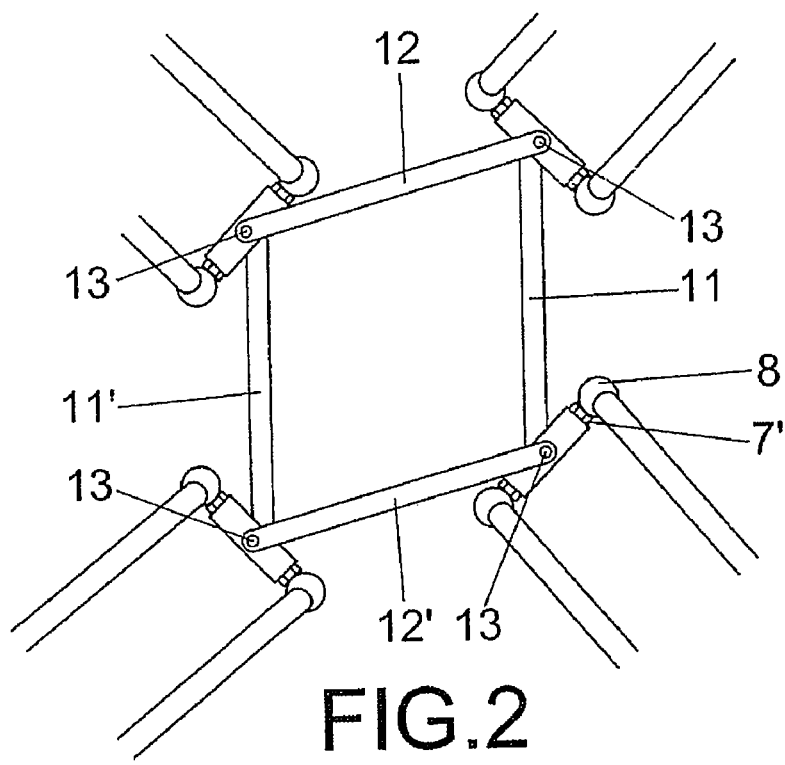
FIG. 2 shows a plan view of a detail of the mobile platform and of its linkages to the kinematic links of the robot.

The robot object of the invention, as can be observed in FIG. 1, comprises four kinematic links (1), linked at one of their ends by means of rotational joints (2), to actuators fixed to the base plate (3), and at their other end to a mobile platform (4) which the working tool (5) is assembled on.

Figure 11:
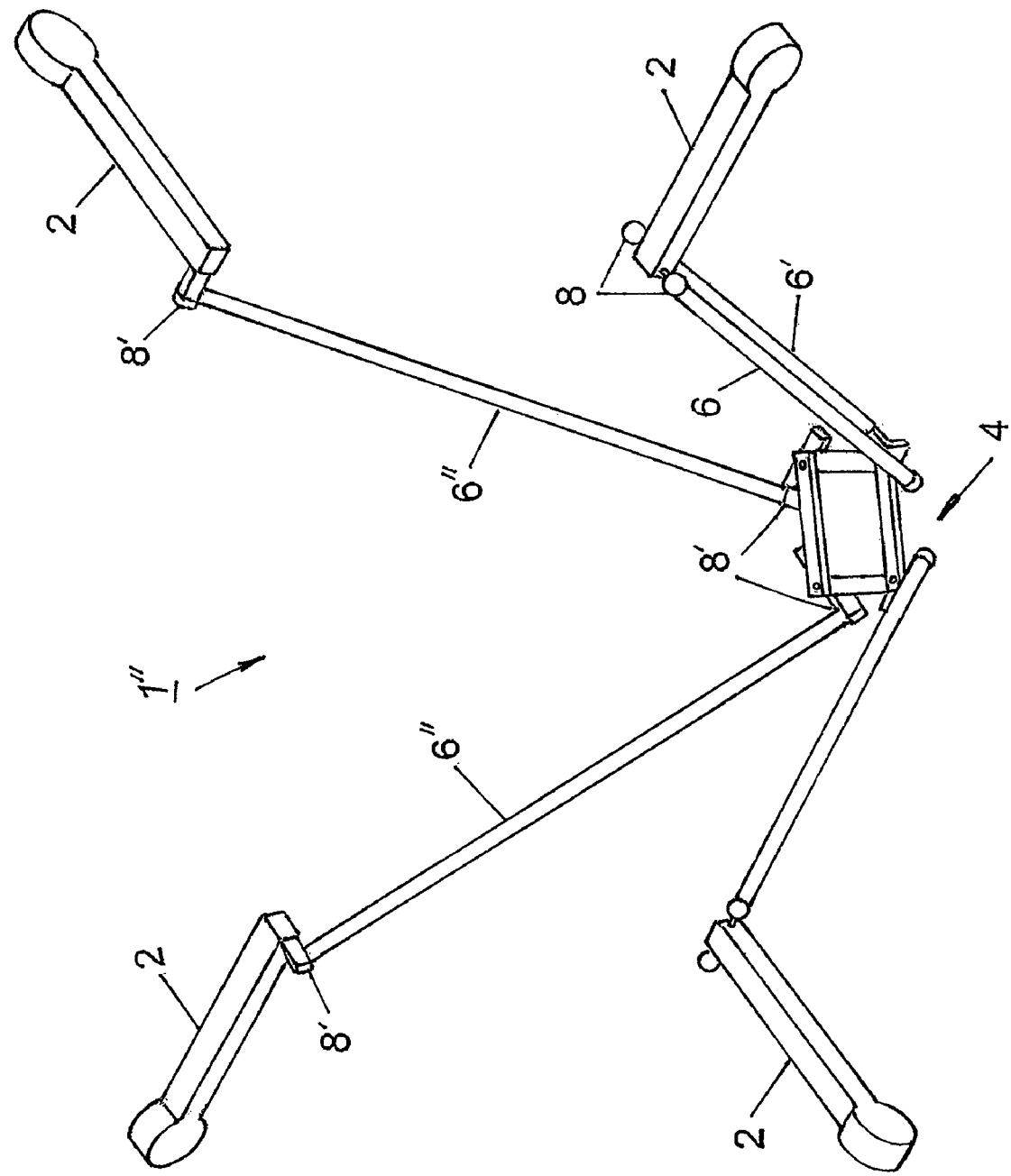
FIG. 11 shows a perspective view of an alternate embodiment of a robot according to the present disclosure, wherein the two of the kinematic links are formed by means of a single bar with two cardan or universal joints at their respective ends, each joint being lined to the mobile platform and to an actuator, respectively.

Each of the kinematic links is made up of four bars (6), (6'), (7), (7'), parallel in pairs, and linked together by means of ball joints (8). In an alternative embodiment (1"), illustrated in FIG. 11, the kinematic links are formed by means of a single bar (6") with two cardan or universal joints (8') at their ends.

Figure 10:
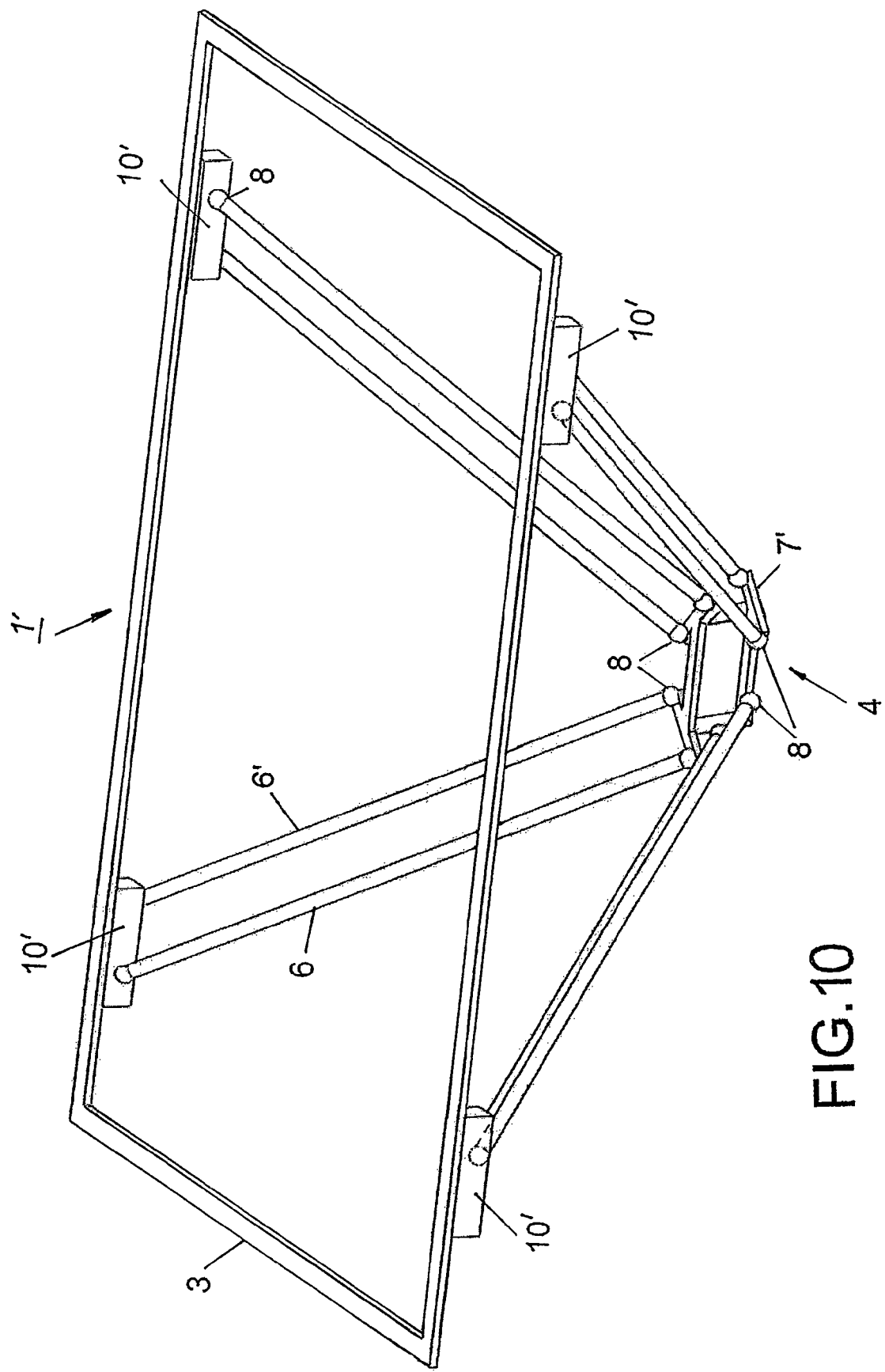
FIG. 10 shows a perspective view of an alternate embodiment of a robot according to the present disclosure, wherein the actuators include linear motors.

Each of the four actuators is made up of a fixing support (9) for fixing it to the base plate (3), a rotational motor (10) linked to the support (9), and an arm integral with the shaft of the motor causing the rotation of the rotational joint (2). In an alternative embodiment (1'), illustrated in FIG. 10, four linear motors (10') arranged in the same plane and aligned in the same direction are used.

The mobile platform (4) is made up of four members (11), (11'), (12), (12'), linked together by means of revolving joints (13), at least two of the members forming the mobile platform (4) are parallel to each other, to form an articulated mobile platform with one degree of freedom in the plane of the mobile platform and, more specially, one rotation in relation to an axis perpendicular to the plane of the mentioned mobile platform (4). This rotation affords the working tool one rotation between −45 and +45°, which can increase by means of additional amplification mechanisms, which will be described below.

The tool (5) is integral with any of the members (11), (11'), (12), (12').

In an embodiment shown in the attached figures, two of the members (11) and (11') are formed by arms having at their ends transverse extensions (14) provided with an inner hole in which the bars (7') of the kinematic links (1) are housed and can rotate, whereas the arms (12) and (12') are formed by bars hingedly linked on the transverse extensions (14) of the bars (11) and (11').

Figure 3:
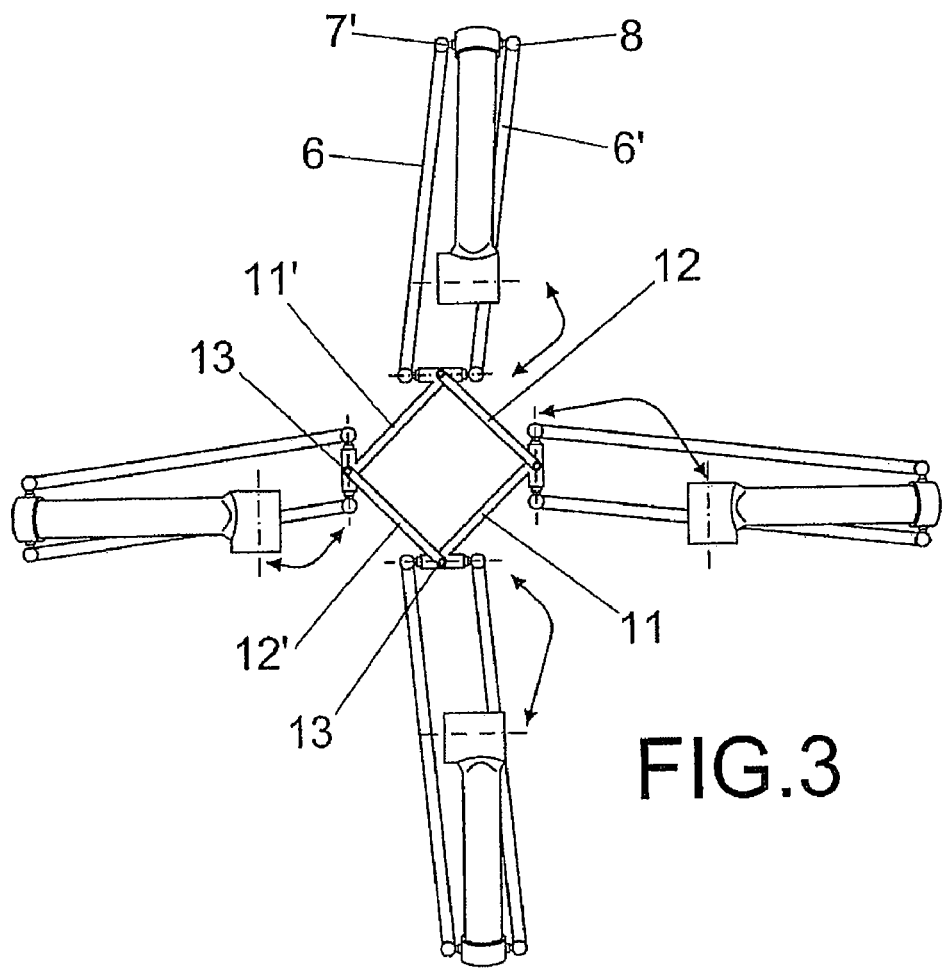
FIG. 3 shows a plan view of the robot object of the invention.

As can be observed in FIG. 3, the bars (7') of the kinematic links (1) have the same spatial orientation as the output shafts of the motors (10) of the actuators, the actuators being symmetrically positioned on the base plate (3), which allows obtaining high rigidity, high positioning precision and homogenous performance in the entire working volume.

Figure 4:
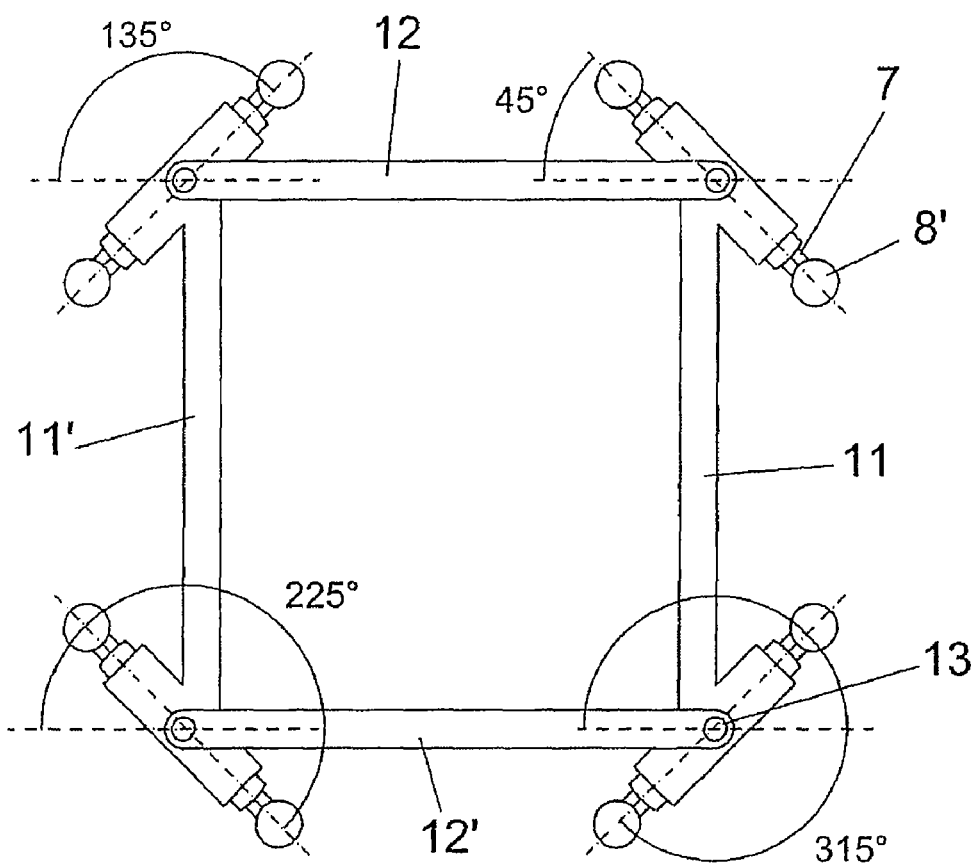
FIG. 4 shows a plan view of the mobile platform and of a preferred embodiment in terms of positioning of the actuators.

The best arrangement of the actuators, and therefore of the bars (7') of the kinematic links and of the extensions (14) of the mobile platform (4), are 45°, 135°, 225° and 315°, as can be observed in FIG. 4, although there are infinite possibilities for the arrangement of the actuators.

The mobile platform can incorporate an amplification mechanism for the rotation of the tool to increase its range of rotation. The assembly of these mechanisms in the mobile platform many times requires additional parts.

Different embodiments of the rotation amplification mechanisms are described below as they are shown in FIGS. 5 to 9.

Figure 5:
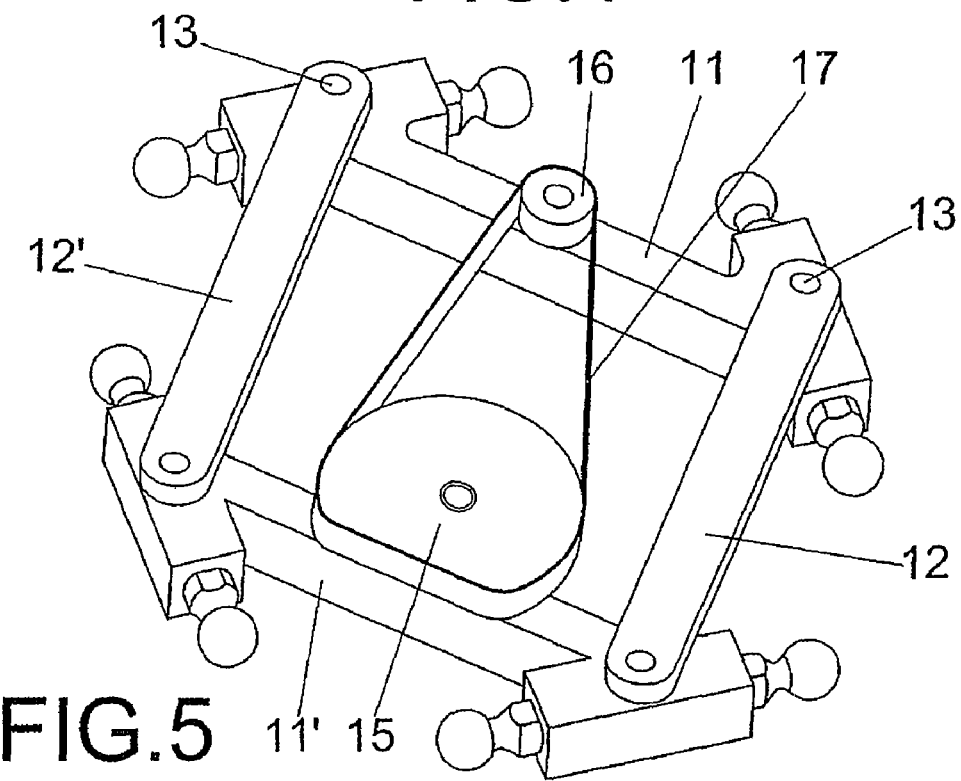
FIG. 5 shows a perspective view of the mobile platform, including an amplification mechanism made up of two pulleys and a belt.

In a first embodiment shown in FIG. 5, the mobile platform (4) is made up of four members (11), (11'), (12), (12'), linked by means of revolving joints (13). At least two of the four members are parallel to each other. The amplification mechanism is made up of two pulleys (15), one assembled on the member (11'), and the other one (16) assembled on the member (11) and a belt (17) arranged between both pulleys (15) (16). In this embodiment, the working tool is linked to the shaft of the pulley (16).

Figure 6:
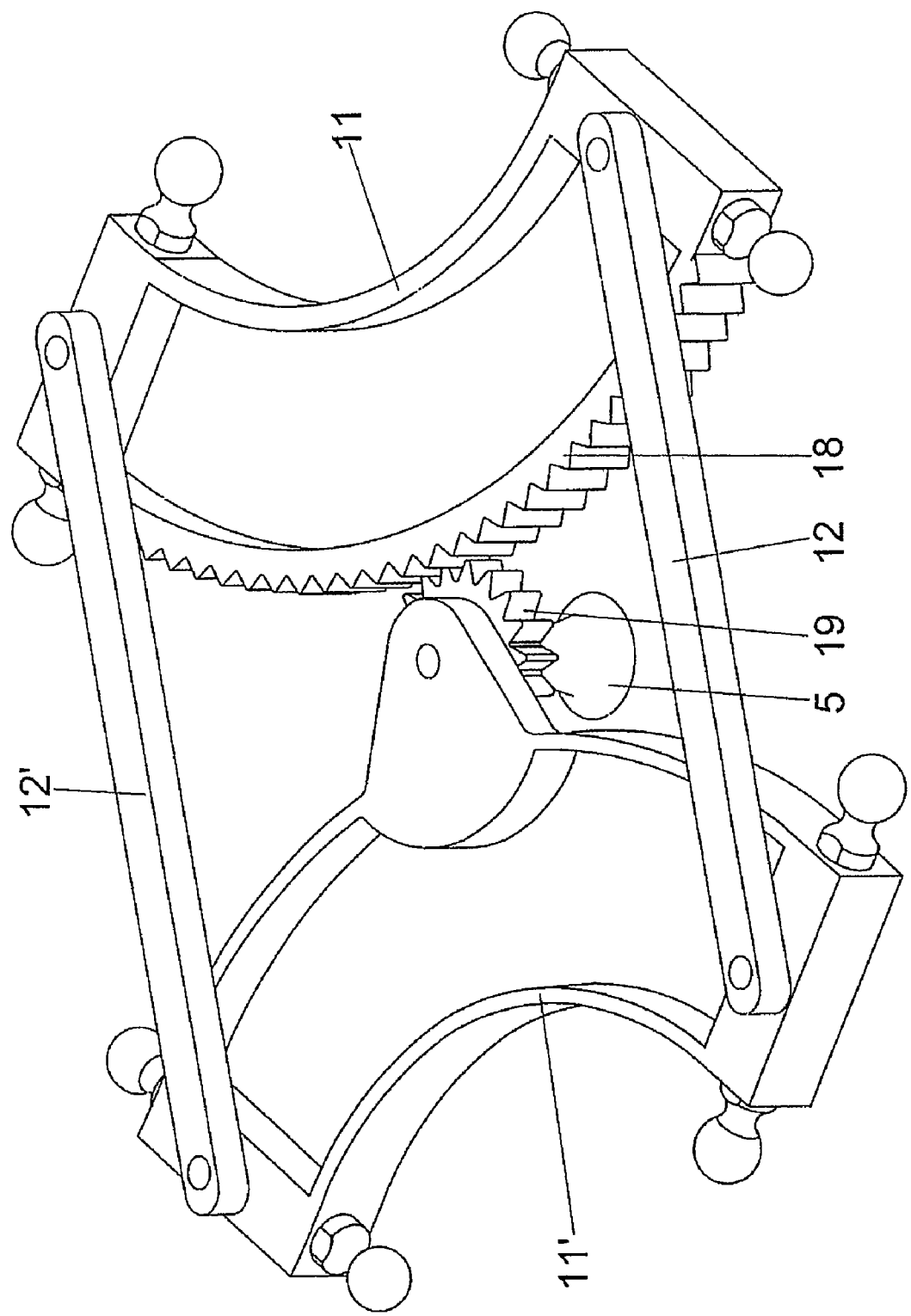
FIG. 6 shows a perspective view of the mobile platform, including the amplification mechanism made up of a notched section and a gear wheel.

In a second embodiment shown in FIG. 6, the member (11) has a gear ring section (18) and the member (11') has a gear wheel (19) meshing with the gear ring sector (18). In this case, the working tool (5) is linked to the gear ring and also has four degrees of freedom.

Figure 7:
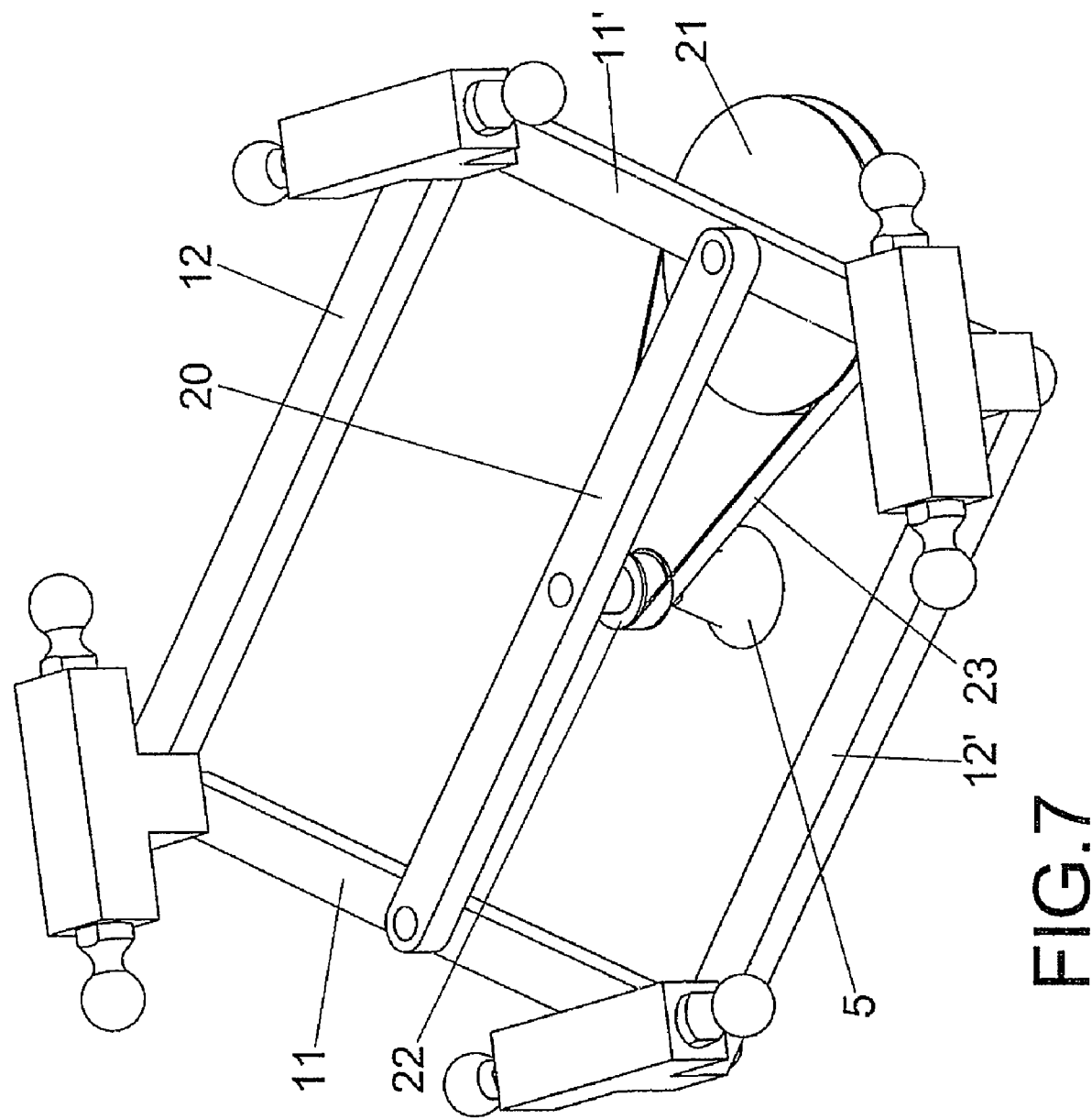
FIG. 7 shows a perspective view of the mobile platform, including an intermediate member and an amplification mechanism made up of two pulleys and a belt.
Figure 8:
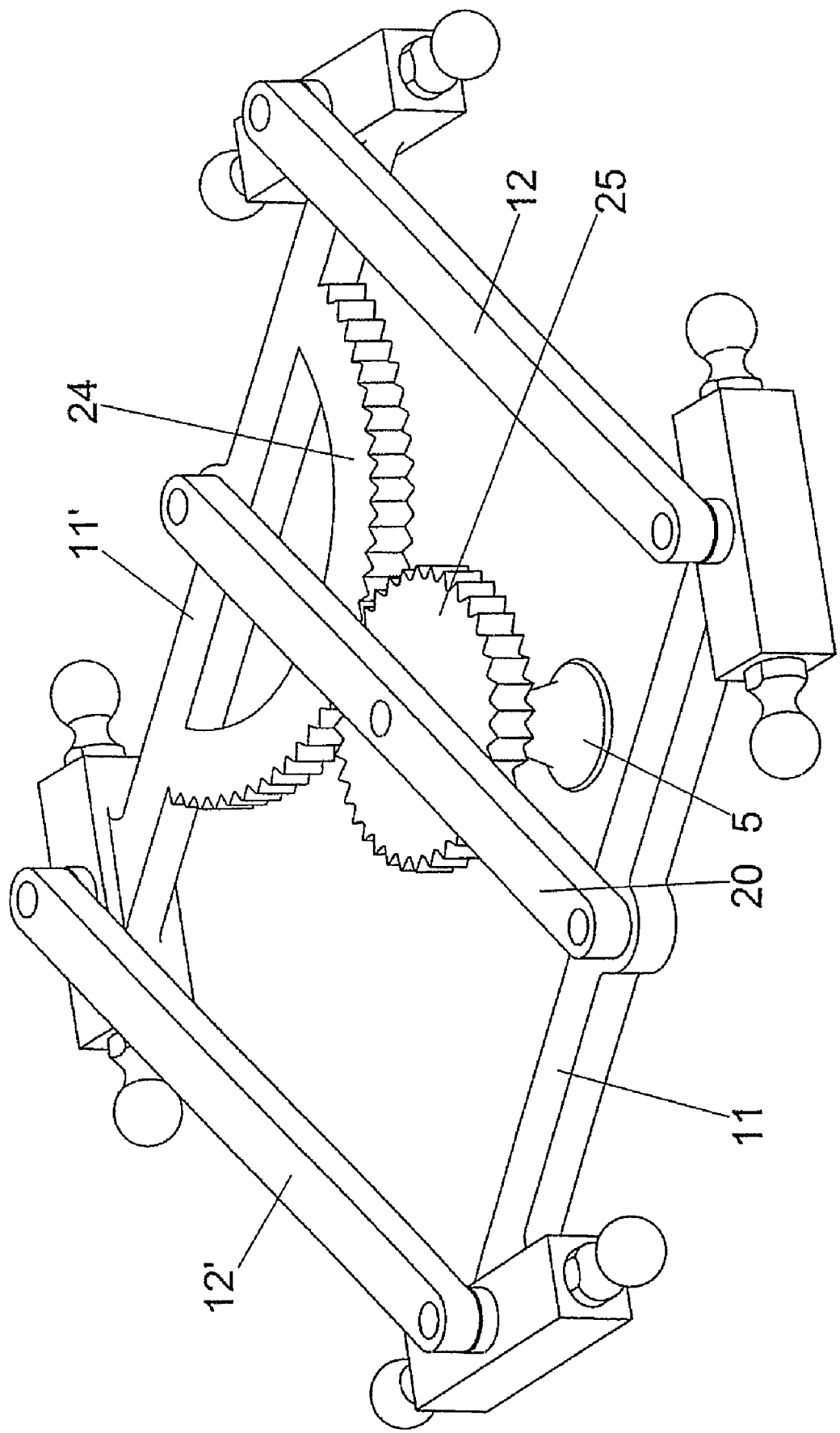
FIG. 8 shows a perspective view of the mobile platform, including an intermediate member and an amplification mechanism made up of a notched section and a gear wheel.

FIGS. 7 and 8 show alternative embodiments in which the mobile platform (4) incorporates an additional member or arm (20).

In an embodiment according to FIG. 7, the mobile platform (4) is formed by five members (11), (11'), (12), (12') and (20), linked together by means of revolving joints. Four members (11) and (11'), (12) and (12') are parallel in pairs and are linked together through their ends. The fifth member (20) is placed parallel to one of the pairs of members (12), (12') and its ends are linked to the other two members (11) and (11').

Amplification of the rotation of the working member is obtained by means of two pulleys (21), (22), one of them assembled on one of the members (11), (11') and the other one on the additional member (20), and the corresponding belt (23). The working tool (5) is assembled on the pulley (22).

In FIG. 8, the mobile platform (4) is made up of the same five members (11), (11'), (12), (12') and (20) of the embodiment shown in FIG. 7, the amplification of the rotation of the working member being obtained by means of a gear ring sector (24) provided in one of the members (11), (11') and a gear wheel (25) assembled in the additional member (20), the working tool (5) being assembled in the gear ring (25).

Figure 9:
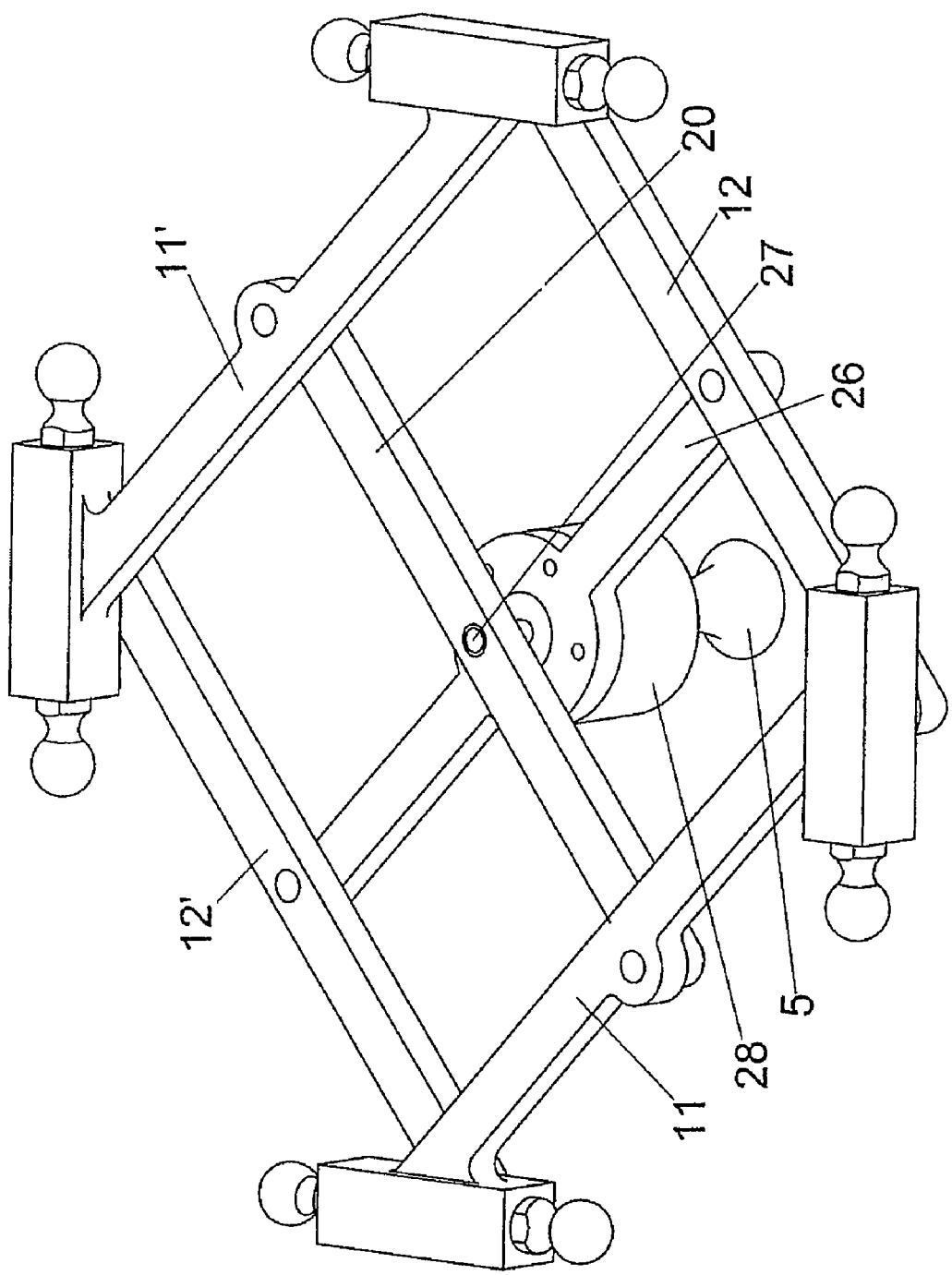
FIG. 9 shows a perspective view of the mobile platform, including two intermediate members and an amplification mechanism made up of a gearbox.

In FIG. 9, the mobile platform (4) is formed by six parts (11), (11'), (12), (12'), (20) and (26) linked together by means of revolving joints. The mobile platform (4) is made up of the same members as those shown in FIGS. (7) and (8) but comprises a sixth member (26) which is placed parallel to the pair of members (11), (11'), such that the six parts are parallel in threes. The two additional members (20) and (26) are linked at a middle point in which the working tool (5) is placed. The rotation amplification is obtained using a gearbox (28) and placing it in the intersection of the two additional parts (20) and (26).

The invention claimed is:

1. A high-speed parallel robot with four degrees of freedom comprising:
    a base plate;
    a mobile platform carrying a tool;
    four actuators, each of said actuators being integral with the base plate;
    four kinematic links, each one of said kinematic links articulated at one of its ends to the mobile platform, and at its other end, through a rotational joint, to a respective one of said actuators,
    wherein the mobile platform includes four members linked together by means of revolving joints, the members being joined together through their ends, each one of said members being parallel to another one of said members so that said members form a planar parallelogram, the members forming an articulated mobile platform with one degree of freedom in the plane of the mobile platform, and the actuators being positioned symmetrically on the base plate.

2. The high-speed parallel robot according to claim 1, wherein the degree of freedom of the mobile platform is one rotation in relation to an axis normal to a plane containing the mobile platform, with a range of −45° to 45°.

3. The high-speed parallel robot according to claim 1, wherein the actuators are positioned in the base plate at 45°, 135°, 225° and 315°.

4. The high-speed parallel robot according to claim 1, wherein the actuators include linear motors arranged in the same plane and aligned in the same direction.

5. The high-speed parallel robot according to claim 1, wherein each of the kinematic links are made up of four bars, parallel in pairs, which are linked together by means of ball joints, being linked to the mobile platform and to the respective actuators, such that a respective linking bar to the mobile platform has the same orientation as the corresponding actuator.

6. The high-speed parallel robot with four degrees of freedom according to claim 1, wherein at least one of its kinematic links is formed by means of a single bar with two cardan or universal joints at its ends, each joint being linked to the mobile platform and to the actuators.

7. The high-speed parallel robot according to claim 1, wherein the four members of the mobile platform are arranged in two parallel pairs.

8. The high-speed parallel robot according to claim 1, wherein no more than four kinematic links connect the mobile platform with respective actuators.

9. The high-speed parallel robot according to claim 1, wherein the mobile platform incorporates an amplification mechanism for the rotation of the tool.

10. The high-speed parallel robot according to claim 9, wherein the amplification mechanism is made up of two pulleys, a first pulley assembled in one of the four members of the mobile platform, and a second pulley linked to another one of the members of the mobile platform, and a belt arranged between both pulleys the tool being assembled on the shaft of the second pulley.

11. The high-speed parallel robot according to claim 9, wherein the amplification mechanism is made up of notched section provided in one of the members of the mobile platform, a gear wheel provided in another one of the members of the mobile platform, the tool being linked to the gear wheel.

12. A high-speed parallel robot with four degrees of freedom comprising:
    four kinematic links, each linked at one of their respective ends to a mobile platform carrying a tool, the kinematic links arranged symmetrically across two mutually perpendicular axes in plane with the mobile platform, and at their other respective ends, through respective rotational joints, to respective actuators, joined with a base plate, wherein the mobile platform is made up of four members, linked together by means of articulated linkages,
    wherein the mobile platform additionally comprises an intermediate member arranged between two of the members of the mobile platform, by means of articulated linkages, the tool being assembled on the intermediate member.

13. The high-speed parallel robot according to claim 12, wherein the members forming the mobile platform are arranged parallel in pairs and the intermediate member is assembled parallel to one of the pairs of arms making up the mobile platform and is linked to the other two members in its central part.

14. The high-speed parallel robot with four degrees of freedom according to claim 13, wherein the mobile platform incorporates an amplification mechanism for the rotation of the working tool.

15. The high-speed parallel robot according to claim 14, wherein the amplification mechanism is made up of two pulleys, a first pulley assembled on one of the four members of the mobile platform and a second pulley linked to the intermediate member, and a belt arranged between both pulleys, the tool being assembled on the shaft of the second pulley.

16. The high-speed parallel robot according to claim 14, wherein the amplification mechanism is made up of notched section provided in one of the members of the mobile platform and a gear wheel provided in the intermediate member, the tool being linked to the gear wheel.

17. A high-speed parallel robot with four degrees of freedom comprising:
   four kinematic links, each linked at one of their respective ends to a mobile platform carrying a tool, the kinematic links arranged symmetrically across two mutually perpendicular axes in plane with the mobile platform, and at their other respective ends, through respective rotational joints, to respective actuators, joined with a base plate, wherein the mobile platform is made up of four members, linked together by means of articulated linkages,
   wherein the mobile platform additionally comprises two intermediate members linked to the mobile platform by means of articulated linkages.

18. The high-speed parallel robot according to claim 17, wherein the members forming the mobile platform are arranged parallel in threes, with a first intermediate members assembled parallel to a first pair of arms forming the mobile platform and linked to the two members of a second pair of arms in its central part, whereas a second intermediate member is assembled parallel to the second pair of arms of the mobile platform and linked to the first pair of arms at its central part, the two intermediate members being linked together at a point where the tool is placed.

19. A high-speed parallel robot with four degrees of freedom comprising four kinematic links, each linked at one of their respective ends to a mobile platform carrying a tool and at their other respective ends, through respective rotational joints, to respective actuators, integral with a base plate, wherein the mobile platform is made up of four members, linked together by means of articulated linkages, wherein the members forming the mobile platform are arranged parallel in threes, with a first intermediate members assembled parallel to a first pair of arms forming the mobile platform and linked to the two members of a second pair of arms in its central part, whereas a second intermediate member is assembled parallel to the second pair of arms of the mobile platform and linked to the first pair of arms at its central part, the two intermediate members being linked together at a point where the tool is placed, and the mobile platform includes an amplification member for the rotation of the tool.

20. The high-speed parallel robot according to claim 19, wherein the amplification member comprises a gearbox, assembled in the linking point of the intermediate members.

* * * * *